Nov. 10, 1953 N. S. BEEBE 2,658,559
ARMREST FOR MOTOR VEHICLES
Filed Jan. 30, 1950
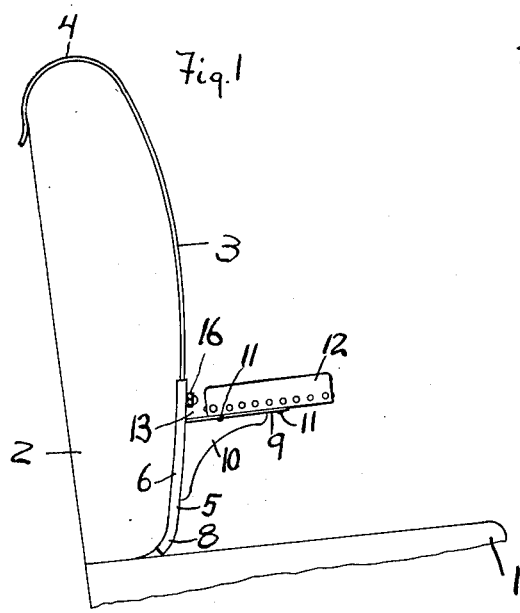
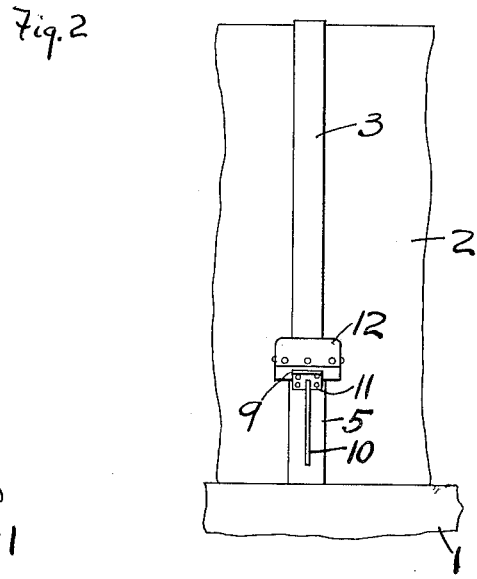
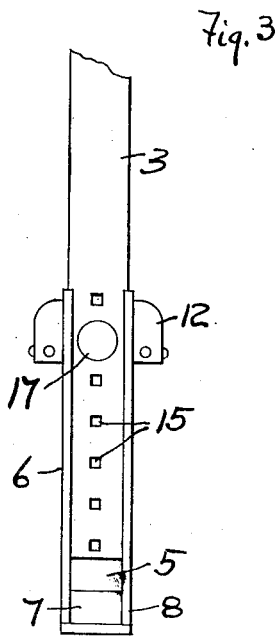
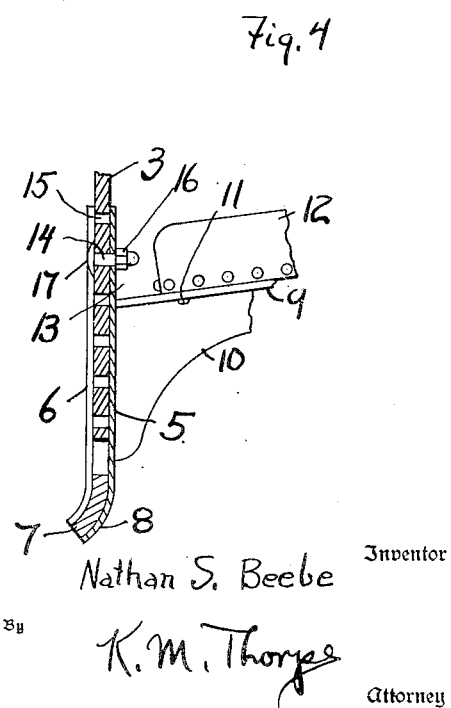
Inventor
Nathan S. Beebe
By K. M. Thorpe
Attorney Patented Nov. 10, 1953

2,658,559

UNITED STATES PATENT OFFICE 2,658,559

ARMREST FOR MOTOR VEHICLES

Nathan S. Beebe, Kansas City, Mo.

Application January 30, 1950, Serial No. 141,310

1 Claim. (Cl. 155—112)

This invention relates to auxiliary arm rests and is particularly designed for use on the front seat of motor vehicles for the benefit of the driver or his passenger. One of the objects of the invention is to produce a device of this kind which is adjustable to suit the convenience of the user and the vertical height of the back of the front seat, and which will have no projecting parts to chaff or injure the fabric of the seat or catch or tear the clothing of the user, or lacerate or pinch his fingers or arms.

Another object is to provide an arm rest which, in general, conforms, to the shape of the back of the seat and is reliably held against up and down or bouncing movement incident to car travel.

A further object of the invention is to produce a device of this kind which is ornamental and does not detract from the appearance of the vehicle.

With the general objects named in view and others as will hereinafter appear, the invention consists in certain novel and useful features of construction and organization of parts as hereinafter described and claimed; and in order that it may be fully understood, reference is to be had to the accompanying drawing, in which:

Figure 1 is a side elevation of a seat to which an arm rest embodying the invention has been applied.

Figure 2 is a face view of the same.

Figure 3 is an enlarged rear elevation of the lower end of the arm rest.

Figure 4 is a central vertical section through the device as shown in Figure 3.

In the said drawing, where like reference characters identify corresponding parts in all of the figures, 1 is the seat and 2 the upstanding back of said seat. Shaped to fit the general contour of the back is a metal strap 3 which is suspended from the top of the seat by a large curved or goose neck portion 4.

The lower end of the strap 3 is slidingly received within a sheath, comprising an imperforate face portion 5 as far as its exposed area is concerned. The margins of the member 5 have reversely bent side edges 6 providing a channel embracing the lower end of the strap 3.

The lower end of the sheath 5 is closed as by insertion of a welded plug 7 or otherwise, and is incurved as at 8 to conform to the contour of the seat back and closely embraces the same. The closed curved end 8 of the sheath guards against accidental projection of the strap 3 and at the same time offers a resistance point to upward movement of the arm rest.

Forwardly projecting from the sheath 5 and welded or otherwise rigidly secured thereto is a metal plate 9 reinforced by an arcuate gusset 10 welded to the sheath. Secured to the top face of the plate 9 as by a series of screws 11 is a padded arm or elbow rest 12.

In order to provide means for adjusting the sheath 5 on the end of the strap 3 to accommodate vehicle backs of different height and for the convenience of the user, the inner end of the padded arm rest 12 is spaced from the proximate face of the sheath 5 to provide an offset or recess 13 for the accommodation of an adjusting clamp bolt 14 as will hereinafter appear.

The sheath 5 in a plane intersecting the offset 13 between the upper and lower faces of the padded arm rest 12, is formed with a rectangular opening which can be brought into register with any of a series of similar openings 15 in the strap 3. The parts are then locked in adjusted position by the clamp bolt 14 which is formed with a rectangular shank and a threaded end receiving the nut 16. The bolt head 17 may thus be clamped against the rear face of the strap 3, it being noted in this connection that the bolt head is so designed that it is entirely received within the channel or space between the edges 6 forming the channel.

From the above description it will be apparent that I have produced a construction embodying all of the features of advantage set forth as desirable, and while I have described and illustrated the preferred embodiment, it is to be understood that I reserve the right to all changes within the spirit and scope of the appended claim.

I claim:

An arm rest comprising a strap formed with a downwardly-facing hook at its upper end for engaging over the back of a seat and provided with a series of spaced bolt-receiving openings at its lower end, a sheath having inturned side edges slidingly embracing the edges and the rear face of the lower end or the strap and having a bolt-receiving-opening adjacent its upper end for selective engagement with the strap openings, a bolt engaging registering openings in the strap and sheath, a support plate forwardly projecting from the sheath below the bolt, a gusset underlying and reinforcing the plate, and an arm rest carried by said plate with its top surface above the plane of the bolt.

NATHAN S. BEEBE.

References Cited in the file of this patent

UNITED STATES PATENTS

| Number | Name | Date |
|---|---|---|
| 1,378,704 | McPartland | May 17, 1921 |
| 1,463,293 | Paddock | July 31, 1923 |
| 1,742,822 | Olson | Jan. 7, 1930 |

FOREIGN PATENTS

| Number | Country | Date |
|---|---|---|
| 247,020 | Great Britain | Feb. 11, 1926 |